(12) United States Patent
Zou et al.

(10) Patent No.: US 9,183,742 B2
(45) Date of Patent: Nov. 10, 2015

(54) METHODS, SYSTEMS AND PROCESSOR-READABLE MEDIA FOR OPTIMIZING INTELLIGENT TRANSPORTATION SYSTEM STRATEGIES UTILIZING SYSTEMATIC GENETIC ALGORITHMS

(71) Applicant: Xerox Corporation, Norwalk, CT (US)

(72) Inventors: Guangyu Zou, Webster, NY (US); Rakesh Kulkarni, Webster, NY (US); Ming Yang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 460 days.

(21) Appl. No.: 13/661,856

(22) Filed: Oct. 26, 2012

(65) Prior Publication Data

US 2014/0122032 A1    May 1, 2014

(51) Int. Cl.
| | |
|---|---|
| *G06F 17/10* | (2006.01) |
| *G08G 1/01* | (2006.01) |
| *G06N 3/12* | (2006.01) |
| *G08G 1/0968* | (2006.01) |
| *G06N 5/00* | (2006.01) |

(52) U.S. Cl.
CPC .............. *G08G 1/0112* (2013.01); *G06N 3/126* (2013.01); *G08G 1/0141* (2013.01); *G08G 1/096811* (2013.01); *G08G 1/096844* (2013.01); *G06N 5/00* (2013.01)

(58) Field of Classification Search
None
See application file for complete search history.

(56) References Cited

U.S. PATENT DOCUMENTS

| | | | |
|---|---|---|---|
| 5,995,737 A | 11/1999 | Bonissone et al. | |
| 6,907,410 B2 | 6/2005 | Chang et al. | |
| 6,907,411 B2 | 6/2005 | Chang et al. | |
| 7,890,568 B2 | 2/2011 | Belenki | |
| 8,044,824 B2 | 10/2011 | Vu et al. | |
| 2009/0018902 A1 | 1/2009 | Miller et al. | |

OTHER PUBLICATIONS

Ma et al., 2001 IEEE Intelligent Transportation Systems Conference Proceedings—Oakland (CA) USA, Aug. 25-29, 2001: 848-853.*
Lou et al., Optimal dynamic pricing strategies for high-occupancy-toll lanes, Transportation Research Part C 19, 2011: 64-74.*

(Continued)

*Primary Examiner* — Kakali Chaki
*Assistant Examiner* — Michael Zidanic
(74) *Attorney, Agent, or Firm* — Kermit D. Lopez; Luis M. Ortiz; Ortiz & Lopez, PLLC

(57) ABSTRACT

Methods, systems and processor-readable media for modeling and optimizing multiple ITS (Intelligent Transportation System) strategies utilizing a systematic genetic algorithm. A traffic simulation model can be configured in conjunction with a genetic algorithm based optimization engine for optimizing the transportation models. An origin-destination matrix that minimizes discrepancies between a simulated and an observed link traffic count can be estimated by considering a road network and a traffic count with respect to a region. A driver behavior can then be determined utilizing the origin-destination matrix via calibration so that the simulation model can replicate a freeway traffic flow in the region. An optimal parameter with respect to the ITS strategies can be determined to optimize a set goal with respect to a given constraint. Such an approach meets a level of service (LOS) metric as well as a revenue target under the applied ITS strategies.

17 Claims, 10 Drawing Sheets

(56) References Cited

OTHER PUBLICATIONS

Yen et al., A hybrid approach to modeling metabolic systems using a genetic algorithm and simplex method, IEEE Transactions on Systems, Man, and Cybernetics—Part B: Cybernetics, vol. 28, No. 2, Apr. 1998: 173-191.*

Hauser, J. R. et al., "Conjoint Analysis, Related Modeling, and Applications," Chapter for Advances in Marketing Research: Progress and Prospects (2002) Sep. 23, 33 pages.

Smith, M. C. et al., "Large-Scale Microscopic Simulation: Toward an Increased Resolution of Transportation Models," Journal of Transportation Engineering (2008) 234(7):273-281.

Yen, J. et al., "A Simplex Genetic Algorithm Hybrid," IEEE International Conference on Evolutionary Computation (1997) Apr. 13-16, pp. 175-180.

Yun, I. et al., "Estimation of Dynamic Origin Destination Matrix: A Genetic Algorithm Approach," Proceedings of the $8^{th}$ International IEEE Conference on Intelligent Transportation Systems (2005) Vienna, Austria, Sep. 13-16, 6 pages.

\* cited by examiner

METHODS, SYSTEMS AND PROCESSOR-READABLE MEDIA FOR OPTIMIZING INTELLIGENT TRANSPORTATION SYSTEM STRATEGIES UTILIZING SYSTEMATIC GENETIC ALGORITHMS

TECHNICAL FIELD

Embodiments are generally related to intelligent transportation systems and techniques. Embodiments are also related to genetic algorithms. Embodiments are additionally related to the optimization of multiple intelligent transportation system strategies utilizing systematic genetic algorithms.

BACKGROUND OF THE INVENTION

Intelligent Transport Systems (ITS) are advanced applications which, without embodying intelligence as such, aim to provide innovative services relating to different modes of transport and traffic management and enable various users to be better informed and make safer, more coordinated, and smarter use of transport networks. ITS strategies such as, for example, High Occupancy Vehicle (HOV)/High Occupancy Toll (HOT) are introduced to reduce traffic congestion and maintain the service level on a freeway. Optimization of multiple ITS strategies independently and simultaneously is a challenge and increasingly impossible without a systematic algorithm.

Conventionally microscopic traffic simulation models are employed to capture the dynamics on a freeway and to model such systems, but they do not provide optimization capability. Also, prior art approaches may have a conflicting effect on the outputs of the system and do not address multiple objectives such as maximizing throughput, maintaining traffic speeds, maximizing revenue, etc.

Based on the foregoing, it is believed that a need exists for an improved method and system for modeling and optimizing multiple ITS strategies utilizing a systematic genetic algorithm, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved intelligent transportation system and technique.

It is another aspect of the disclosed embodiments to provide for an improved genetic algorithm.

It is further aspect of the disclosed embodiments to provide for methods, systems and processor-readable media for modeling and optimizing multiple ITS strategies utilizing a systematic genetic algorithm.

The aforementioned aspects and other objectives and advantages can now be achieved as described herein. Methods, systems and processor-readable media for modeling and optimizing multiple ITS (Intelligent Transportation System) strategies utilizing a systematic genetic algorithm are disclosed herein. A traffic simulation model can be configured in conjunction with a genetic algorithm based optimization engine for optimizing the transportation models. An origin-destination matrix that minimizes discrepancies between a simulated and an observed link traffic count can be estimated by considering a road network and a traffic count with respect to a region. A driver behavior parameter (e.g., mean target headway, mean reaction time, and time step) can then be determined utilizing the origin-destination matrix via calibration so that the simulation model can replicate a freeway traffic flow in the region. An optimal parameter (e.g., pricing algorithm parameter, ramp metering mechanism, speed limit) with respect to the ITS strategies can be determined to optimize a set goal with respect to a given constraint. Such an approach meets a level of service (LOS) metric as well as a revenue target under the applied ITS strategies.

The origin-destination matrix can be obtained utilizing a survey-based approach and/or an estimation approach based on the traffic volume on the roads. The goals include but are not limited to maximizing revenue, maximizing throughputs, and minimizing accident rates, etc. The constraints include but are not limited to maintaining the average speed and maintaining the density, etc. The genetic algorithm can be combined with a simplex approach by setting an objective function and encoding a set of configuration parameters to genes. A fitness for each gene can then be computed and the genes can be changed utilizing a genetic operator such as, for example, crossover and mutation. The genes with higher fitness levels can be selected as next generation genes in terms of the distance between an observed and simulated metric. The validation process can be terminated if maximum iteration times are reached and/or a gene with fitness greater than a predefined threshold emerges.

The parameters to be optimized for a particular stage can be initially set to a particular value. The simulation model can batch run to output the simulated metrics. In the genetic algorithm (with Simplex) based optimization engine, the simulated metrics can be compared with desired metrics to determine a fitness ("goodness") of the gene (e.g., set of parameter values for that batch run). The candidate solutions i.e., new parameter values found from the optimization engine can be fed back into the simulation model. This process can be repeated to obtain the optimized parameters for that stage. The output of one stage can be employed as an input for the next stage. The GA-based optimization engine can be employed to maximize revenue and throughput obtained from a toll charged for a HOT lane based on the pricing algorithm and the ramp metering mechanism without loss of generality.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
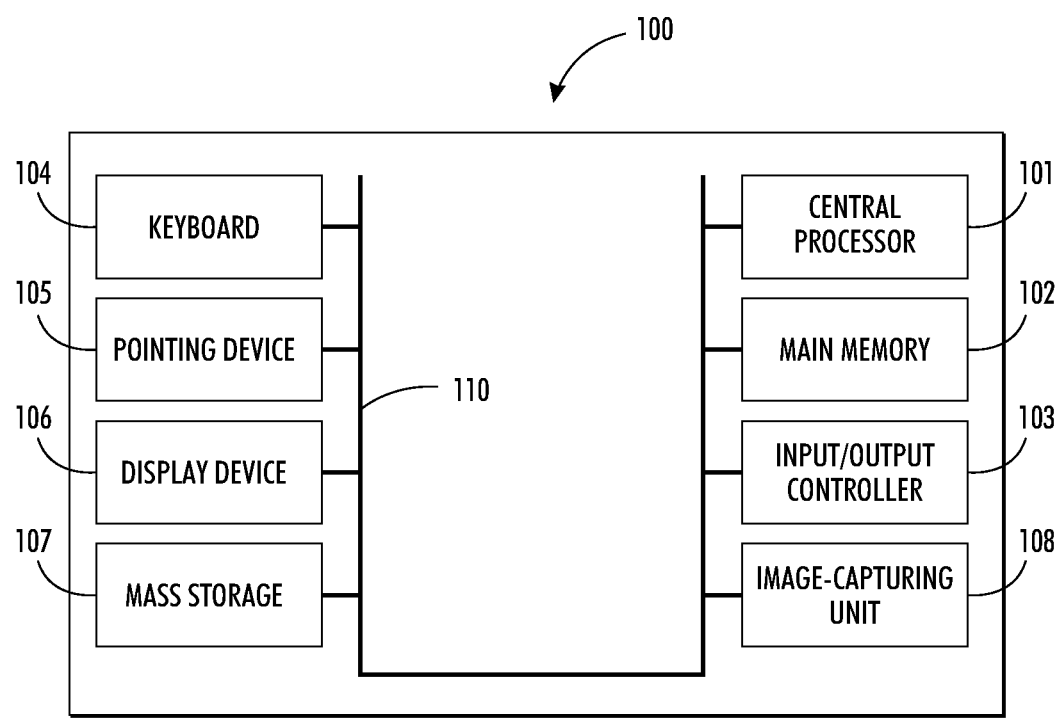
FIG. 1 illustrates a schematic view of a computer system, in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
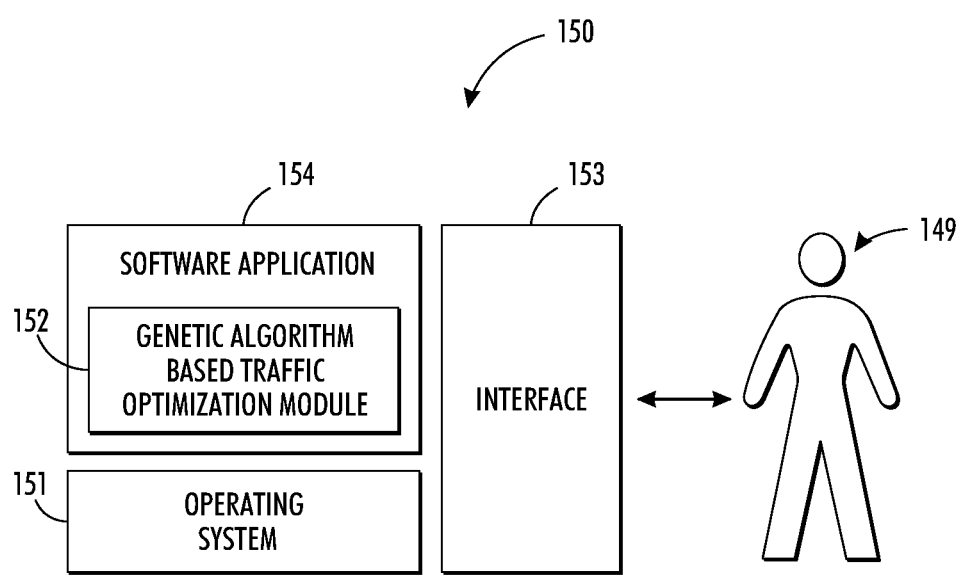
FIG. 2 illustrates a schematic view of a software system including a genetic algorithm based traffic optimization module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a system bus 110, a central processor 101, a main memory 102, an input/output controller 103, a keyboard 104, an input device 105 (e.g., a pointing device such as a mouse, track ball, and pen device, etc.), a display device 106, a mass storage 107 (e.g., a hard disk), and an image capturing unit 108. In some embodiments, for example, a USB peripheral connection (not shown in FIG. 1) and/or other hardware components may also be in electrical communication with the system bus 110 and components thereof. As illustrated, the various components of data-processing system 100 can communicate electronically through the system bus 110 or a similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), also serves to display results, whereupon the user may supply additional inputs or terminate the session. In an example embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. The software application 154 can include a genetic algorithm based traffic optimization module 152 for optimizing multiple ITS (Intelligent Transportation System) strategies utilizing a systematic genetic algorithm 212. Software application 154, on the other hand, can include instructions, such as the various operations described herein with respect to the various components and modules described herein such as, for example, the methods 400 and 500 depicted in FIGS. 4-5.

FIGS. 1-2 are thus intended as examples and not as architectural limitations of the disclosed embodiments. Additionally, such embodiments are not limited to any particular application or computing or data-processing environment. Instead, those skilled in the art will appreciate that the disclosed approach may be advantageously applied to a variety of systems and application software. Moreover, embodiments can be embodied on a variety of different computing platforms, including Macintosh, UNIX, LINUX, and the like.

Figure 3:
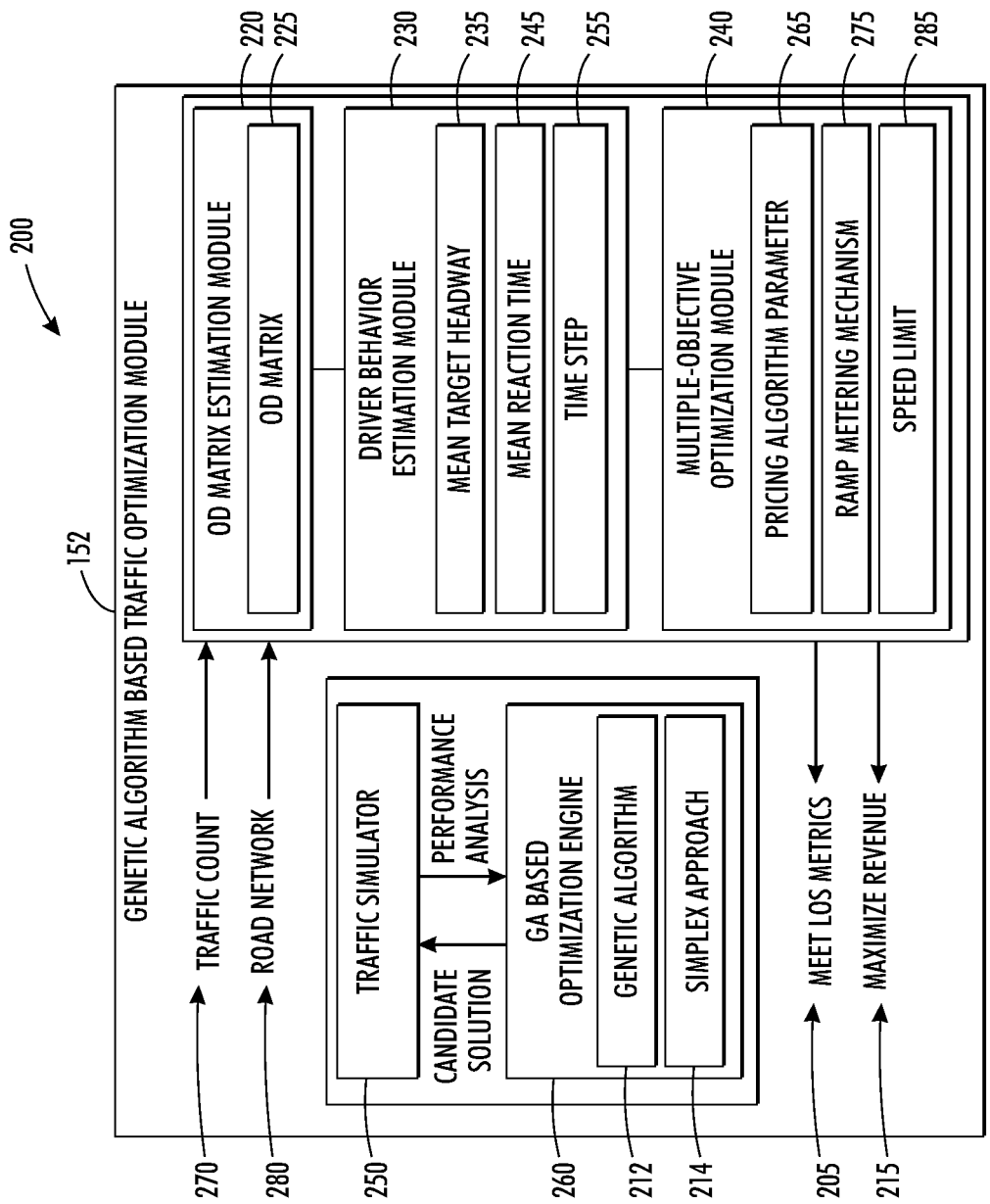
FIG. 3 illustrates a block diagram of a genetic algorithm based traffic optimization system, in accordance with the disclosed embodiments.

FIG. 3 illustrates a block diagram of a genetic algorithm based traffic optimization system 200, in accordance with the disclosed embodiments. Note that in FIGS. 1-12, identical or similar blocks are generally indicated by identical reference numerals. The genetic algorithm based traffic optimization system 200 can be configured to include the genetic algorithm based traffic optimization module 152 for optimizing multiple ITS (Intelligent Transportation System) strategies utilizing a systematic genetic algorithm 212. The genetic algorithm based traffic optimization module 152 includes a traffic simulation model 250 configured in conjunction with a genetic algorithm based optimization engine 260 for optimizing the transportation models.

The genetic algorithm based traffic optimization module 152 further includes an OD matrix estimation module 220, a driver behavior estimation module 230, and a multiple objective optimization module 240. The OD matrix estimation module 220 estimates an origin-destination matrix 225 that minimizes discrepancies between a simulated and an observed link traffic count by considering a road network 280 and a traffic count 270 with respect to a region. The origin-destination matrix 225 can be obtained utilizing a survey-based approach and/or an estimation approach based on the traffic volume on the roads.

The driver behavior estimation module 230 determines a driver behavior parameter such as, for example, a mean target headway 235, a mean reaction time 245, and a time step 255 utilizing the origin-destination matrix 225 via calibration so that the traffic simulation model 250 can replicate a freeway traffic flow in the region. The multiple objective optimization module 240 determines an optimal parameter, such as for example, a pricing algorithm parameter 265, a ramp metering mechanism 275, and a speed limit 285 with respect to the ITS strategies to optimize a set goal with respect to a given constraint. The goals include but are not limited to maximizing revenue, maximizing throughputs, and minimizing accident rates, etc. The constraints include but are not limited to maintaining the average speed, and maintaining the density, etc.

The genetic algorithm 212 can be combined with a simplex approach 214 by setting an objective function and encoding a configuration parameter to genes. The fitness for each gene can be then computed and the genes changed utilizing a genetic operator such as, for example, crossover and mutation. The genes with higher fitness levels can be selected as a next generation in terms of the distance between an observed metric and a simulated metric. The validation process can be terminated if maximum iteration times are reached and/or a gene with fitness greater than a predefined threshold emerges.

The traffic simulator 250 can be employed in conjunction with the optimization engine 260 to output the results from each stage. The parameters to be optimized for a particular stage can be initially set at certain values. The traffic simulator 250 batch runs the simulation model to output the simulated metrics. In the genetic algorithm (with Simplex) based optimization engine 260, the simulated metrics can be compared with desired metrics to determine the fitness (e.g., "goodness") of the gene (e.g., set of parameter values for that batch run). The optimization algorithm 212 can be exercised. The candidate solutions (i.e., new parameter values found from the optimization engine 260) can be fed back into the simulation model. This process can be repeated to obtain the optimized parameters for that stage. The output of one stage can be employed as an input to the next stage. The system 200 meets a level of service (LOS) metric 205 as well as a revenue target 215 under the applied ITS strategies.

Figure 4:
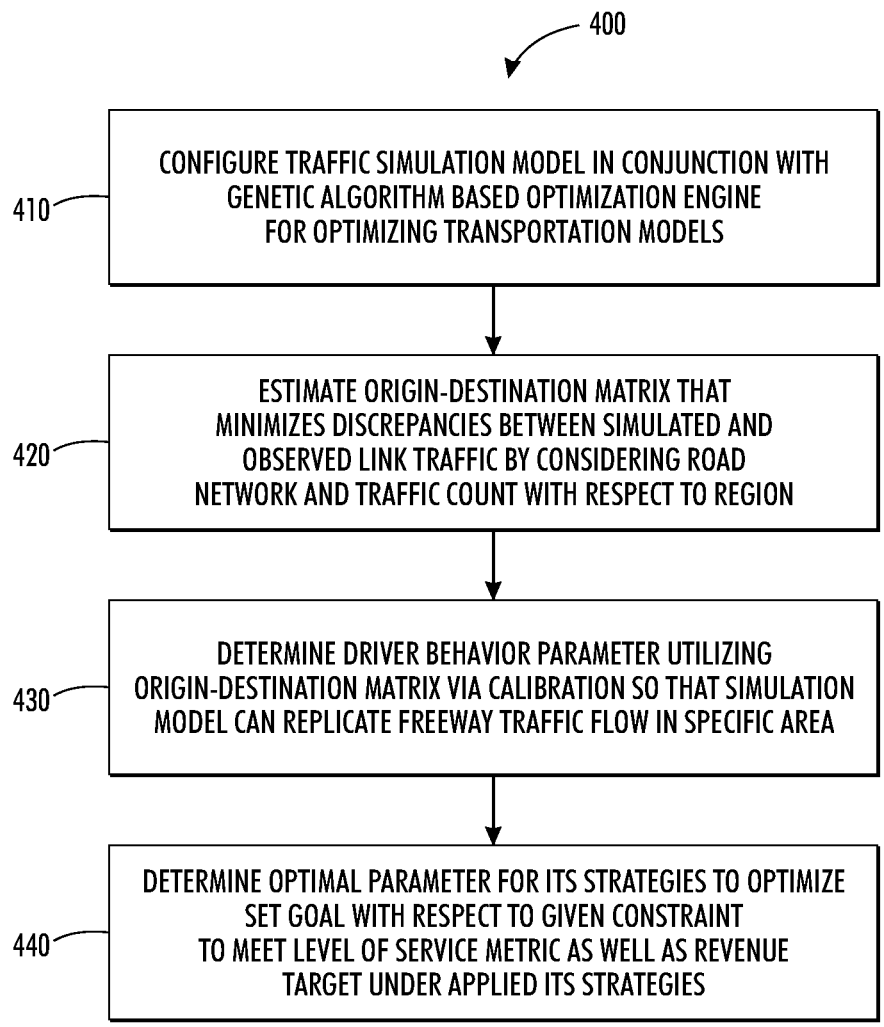
FIG. 4 illustrates a high level flow chart of operations illustrating logical operational steps of a method for optimizing multiple ITS strategies utilizing a systematic genetic algorithm, in accordance with the disclosed embodiments.

FIG. 4 illustrates a high level flow chart of operations illustrating logical operational steps of a method 400 for optimizing multiple strategies utilizing the systematic genetic algorithm 212, in accordance with the disclosed embodiments. Initially, as indicated at block 410, the traffic simulation model 250 can be configured in conjunction with the genetic algorithm based optimization engine 260 for optimizing the transportation models. The origin-destination matrix 225 that minimizes discrepancies between the simulated and an observed link traffic count can be estimated by considering the road network 280 and the traffic count 270 with respect to a region, as illustrated at block 420. The driver behavior parameter (e.g., mean target headway, mean reaction time, and time step) can then be determined utilizing the origin-destination matrix 225 via calibration so that the simulation model can replicate a freeway traffic flow in the region, as depicted at block 430.

The driver behavior parameters to be calculated with their ranges are shown in Table 1.

TABLE 1

| Parameter Name | Description | Range |
|---|---|---|
| Mean Target Headway | It specifies the global mean target headway, in seconds, between a vehicle and a following vehicle | [0.3, 2.6] |
| Mean Reaction Time | It defines the lag time that the following vehicles react to the change of the preceding vehicles. | [0.3, 2.4] |
| Time Step | It represents the number of discrete times per real time second that a decision is made during simulation. | [2, 6] |

The optimal parameter (e.g., pricing algorithm parameter, ramp metering mechanism, speed limit) with respect to the ITS strategies can be determined to optimize a set goal with respect to a given constraint, as shown at block 440.

Figure 5:
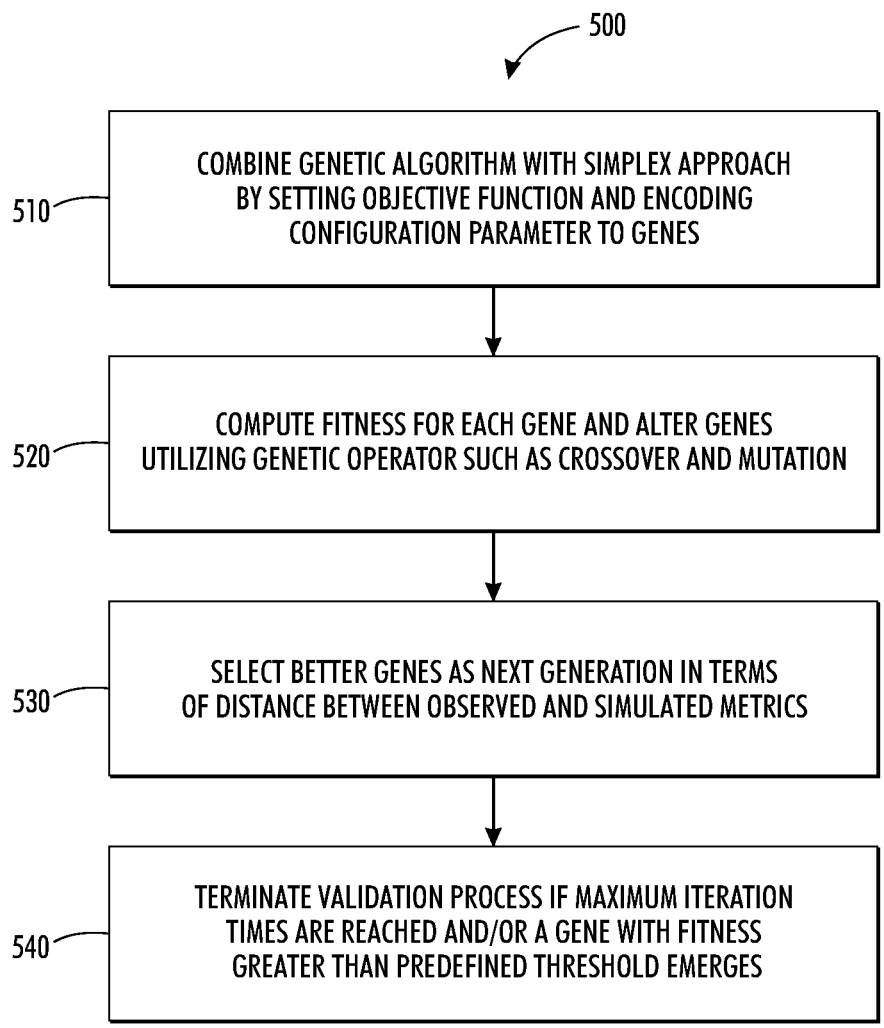
FIG. 5 illustrates a high level flow chart of operations illustrating logical operational steps of a method for combining a genetic algorithm with a simplex approach, in accordance with the disclosed embodiments.
Figure 6:
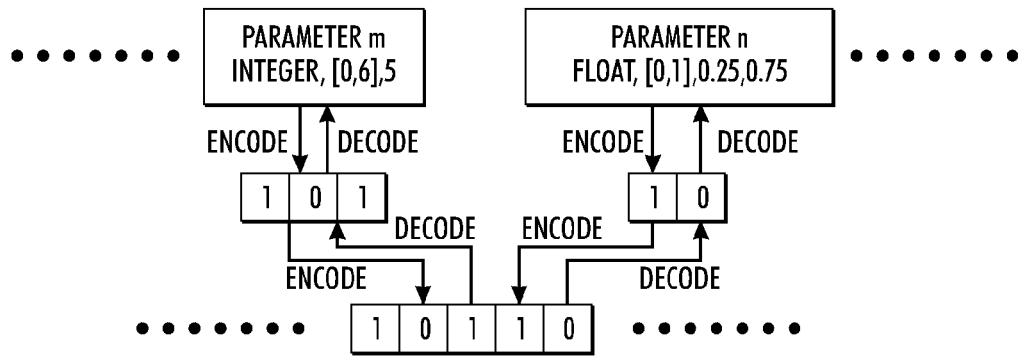
FIG. 6 illustrates a schematic view of a gene encoding/decoding, in accordance with the disclosed embodiments.

FIG. 5 illustrates a high level flow chart of operations illustrating logical operational steps of a method 500 for combining the genetic algorithm 212 with the simplex approach 214, in accordance with the disclosed embodiments. Initially, as shown at block 510, the genetic algorithm 212 can be combined with the simplex approach 214 by setting an objective function and encoding a configuration parameter to genes. As far as the estimation of the OD matrix 225 is concerned, the objective function is to minimize the discrepancy between the simulated and observed metrics as illustrated below in equation (1)

$$\min \sqrt{\sum_{i=1}^{n}(x_i - X_i)^2} \quad (1)$$

where $x_i$ and $X_i$ represent the $i^{th}$ simulated and observed metrics respectively. Gene encoding refers to the process of converting configuration parameters to genes that evolve toward the parameter space that exhibits accurate results with respect to system data. In general, genes can be presented in binary strings, where each element is 0 or 1. It is essential to determine how many bits are required to represent a configuration parameter, which in turn is determined by the value range and the degree of precision needed. If the configuration parameter is integral, then a binary presentation of the integer can be employed as the gene. If the configuration parameter is float, the degree of precision must be set up in advance so that the binary presentation of the float number satisfies the requirements. If the configuration parameter possess a fixed amount of feasible values, then the number of bits of a corresponding gene can be determined by a total number of feasible values. FIG. 6 illustrates a schematic view of a gene coding 600 for integer and float parameters, in accordance with the disclosed embodiments.

A fitness for each gene can be computed and the genes can be changed utilizing a genetic operator such as, for example, crossover and mutation, as shown at block 520. The fitness of each gene can be determined by the distance between the observed metrics and the simulated metrics. The shorter the distance is, the higher the fitness is. The gene can be decoded to its actual parameters and the simulation model can batch run to collect the average value in order to obtain the simulated metrics for a given specific gene. For example, the processor in a Paramics suite can batch-run the simulation model, however, the parameters values cannot be changed dynamically. So, a Java program that invokes the processor command line can be invoked to run the simulation model. Before each run, the corresponding files that contain the configuration parameters can be modified so that the following simulation is based on the configuration parameters that converted from the gene.

The genes can be changed utilizing a genetic operator such as crossover and mutation. Reproduction is the process of generating the next generation of genes, where two genetic operators can be employed, i.e., crossover and mutation. For crossover, there are two options: one-point crossover and two-point crossover. One-point crossover means that two genes exchange the parts beginning at the randomly selected cross point. Two-point crossover can be defined as two genes that exchange the part between the first and the second cross point. Crossover is a binary operator. On the other hand, mutation is a unary operator. There is a very small probability of mutation. An operation can be performed to iterate all genes. If a randomly generated number is less than the mutation probability, then a mutation may occur. When a mutation happens, the strategy randomly chooses a mutation point and then flips the bit.

The genes with higher fitness can be selected as a next generation in terms of the distance between an observed and simulated metric, as indicated at block 530. Selection is the process of updating population in terms of a fitness-based function. The higher the fitness of a gene is, the more likely the gene is selected. In the population including both parents and children, a fixed number of genes can be selected as the next generation. For each gene, the probability for it to be selected is based on its fitness as indicated in equation (2) as follows:

$$pp_i = \sum_{j=1}^{i} p_j \quad (2)$$

$$p_j = \frac{f_j}{\sum_{k=1}^{N} f_k}$$

where $p_j$ represents the probability for gene i to be selected. $pp_i$ represents the accumulated probability. $f_j$ represents the fitness of gene j. Only if $pp_i \geq \text{rand}(0,1) \geq pp_{i-1}$, the gene i can be selected.

The iterative process can be terminated if maximum iteration times are reached and/or a gene with fitness greater than a predefined threshold emerges, as shown at block 540. In order to accelerate the convergence of the genetic algorithm and increase the likelihood to determine the optimal value, the simplex algorithm can be added to be another genetic operator. A simplex is a polytope with n+1 vertices in a n-dimensional environment. The simplex algorithm continually forms a new simplex by replacing the worst point $X_W$ in the simplex with a new point $X_R$ generated by reflecting $X_W$ over the center $\overline{X}$ of the simplex as illustrated below in equation (3).

$$X_R = \overline{X} + (\overline{X} - X_W) \tag{3}$$

The algorithm can be represented as indicated in equations (4, 5 and 6) as follows:
If $X_R > X_B$ $$X_N = \overline{X} + \alpha(\overline{X} - X_W)\ 1 < \alpha < 2 \tag{4}$$

else if $X_R < X_W$ $$X_N = \overline{X} - \alpha(\overline{X} - X_W)\ 0 < \alpha < 1 \tag{5}$$

else if $X_R < X_{2ndW}$ $$X_N = \overline{X} - \alpha(\overline{X} - X_W)\ 0 < \alpha < 1 \tag{6}$$

where $X_B$ denotes the best point. $X_{2ndW}$ represents the second worst point, $\alpha$ represents the coefficient to adjust an extension level of reflection from the worst point. $X_N$ represents the new point to replace the worst point to form the new simplex with the remaining points.

Figure 7:
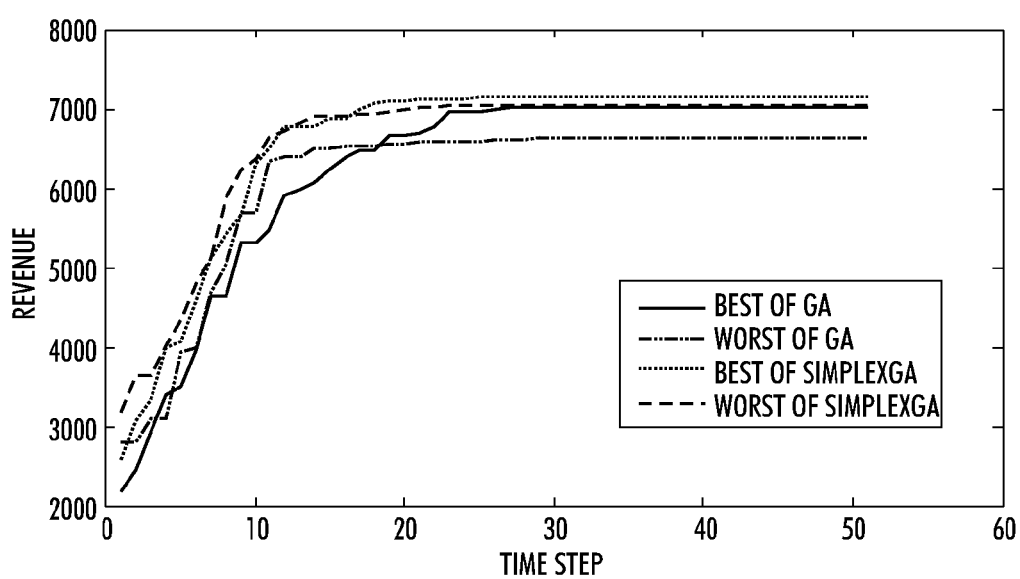
FIG. 7 illustrates a graph depicting comparison of a classical genetic algorithm with a simplex genetic algorithm, in accordance with the disclosed embodiments.

FIG. 7 illustrates a graph depicting comparison of the genetic algorithm 212 with a simplex genetic algorithm, in accordance with the disclosed embodiments. The genetic algorithm 212 combined with the simplex approach 214 has better performance than the classical GA, and the simplex GA is more likely to determine better genes. The fact that distinguishes HOT transportation system from others is that drivers decides whether or not to travel on the HOT lane based on utility functions for HOT and GP (General-Purpose) lane. Equation (7) and (8) are examples of utility functions for HOT and GP respectively.

$$U_{HOT} = \frac{1}{aTT_{HOT} + TR} \tag{7}$$

$$U_{GP} = \frac{1}{aTT_{GP}} \tag{8}$$

where $\alpha$ represents the value of time. TR represents the toll rate. $TT_{HOT}$ and $TT_{GP}$ are the travelling time on HOT and GP lanes respectively. If $U_{HOT} > U_{GP}$, then drivers choose to enter the HOT lane. Otherwise, they remain on the GP lane. In addition, increasing the toll rate results in decreasing the number of vehicles that take the HOT lane. So, the objective function is to maximize the product of the toll rate and the number of vehicles on HOT lane as shown in equation (9):

$$\max \sum_{i=1}^{N} TR_i \times NV_i^{HOT} \tag{9}$$

s.t.

-continued $$0 < TR \leq 15$$

$$55 \leq TS \leq 60$$

$$1 \leq MR \leq 50$$

where $NV_i^{HOT}$ represents the number of vehicles on the HOT lane at the time period I, $TR_i$ represents the toll rate at the time I, N represents the total number of time steps, TS indicates the target speed on the HOT, and MR denotes the ramp metering rate.

Figure 8:
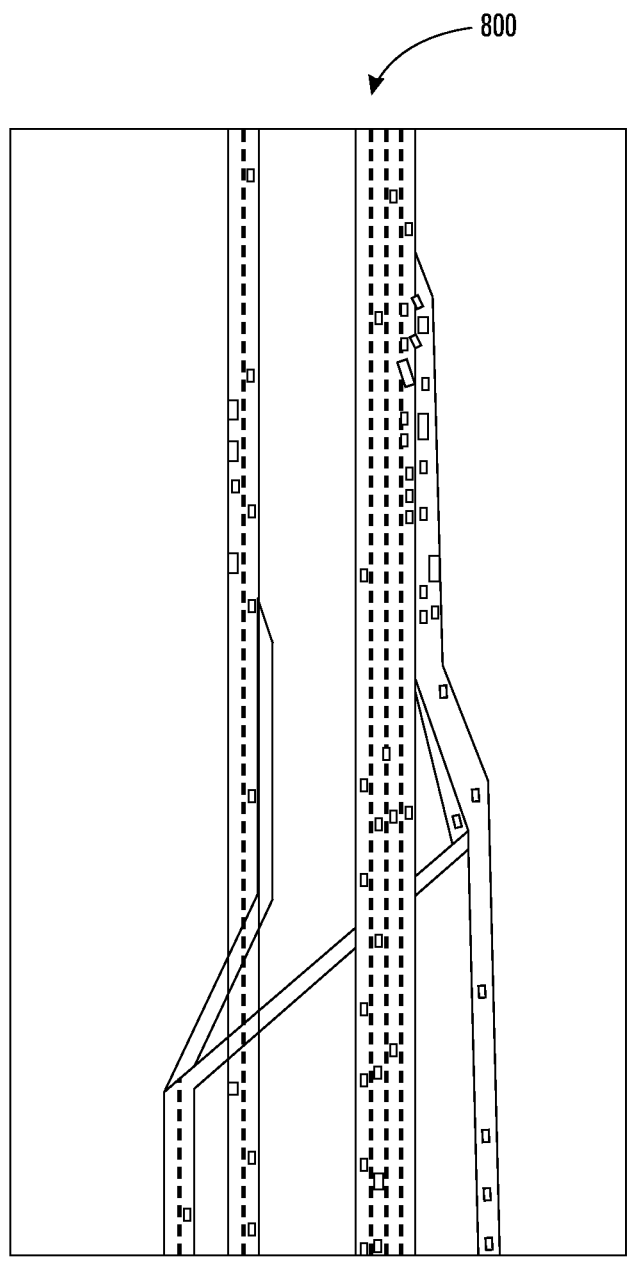
FIG. 8 illustrates an exemplary view of a simulation model, in accordance with the disclosed embodiments.

FIG. 8 illustrates an exemplary view of a simulation model 800, in accordance with the disclosed embodiments. For example, the GA-based optimization module 152 can be employed to calibrate and optimize the simulation model I-95. The GA-based framework can be employed to estimate the OD matrix 225. The goal is that the simulated metrics for each detector match their observed values in the field to assist making the simulation model as close to the real world as possible. There are 8 locations where detectors are installed along I-95. Table 2 lists all the detectors and their observed values.

TABLE 2

| Detector | Location | Observed Values |
| --- | --- | --- |
| 600291 | North of NW 17 ST | 3431 |
| 600471 | North of NW 62 ST | 6432 |
| 600521 | North of NW 77 ST | 6149 |
| 600621 | AT NW 96 ST | 6451 |
| 600711 | South of NW 111 ST | 7004 |
| 600791 | South of NW 131 ST | 5720 |
| 600921 | South of NW 151 ST | 7931 |
| 690471 | North of NW 62 ST | 2491 |

The OD matrix 225 defines the amount of vehicles travelling from the source/origins to the destinations. Along with I-95 NB there are totally 21 entries/exits that are called "zone" in Paramics, So, there are up to 21*20=420 pairs of source/destination zones. Each cell in Table 3 represents the demand between each pair of source/destination zones. The initial OD matrix can be generated in Paramics.

TABLE 3

| | To | | | |
| --- | --- | --- | --- | --- |
| From | Zone 1 | Zone 2 | ... | Zone 21 |
| Zone 1 | 0 | 20 | ... | 19 |
| Zone 2 | 129 | 0 | ... | 15 |
| ... | ... | ... | ... | ... |
| Zone 21 | 11 | 52 | ... | 0 |

Figure 9:
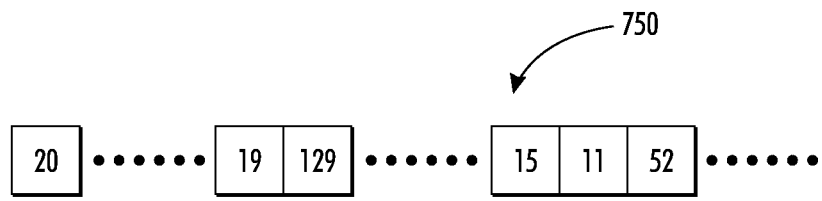
FIG. 9 illustrates an exemplary view of a gene, in accordance with the disclosed embodiments.

All non-zero values from the Paramics output can be combined in a string as genes, which change and evolve in the G.A. FIG. 9 illustrates an exemplary view of a gene 750, in accordance with the disclosed embodiments. For each gene, the fitness can be computed as illustrated below in equation (10) as follows:

$$\frac{1}{\sqrt{\sum_{i=1}^{n}(x_i - X_i)^2}} \tag{10}$$

where the variable $x_i$ represents the simulated value for the $i^{th}$ detector, and the variable $X_i$ represents the observed value for the $i^{th}$ detector. Since there are totally 14 detectors, the variable n is equal to 14. When running the simulation model for a given specific gene, parallel computing of multi-core CPUs can be employed. For example, if the computer possesses two cores in its CPU, two threads can be created, one of which corresponds to one individual simulation model of I-95. After running the GA-based module 152, the best OD matrix 225 with simulated outputs compared to observed outputs can be obtained, as shown in Table 4. Based on the comparison, the GA-based platform is effective in estimating the OD matrix 225.

TABLE 4

| Detector | Observed Values | Simulated Values |
| --- | --- | --- |
| 600291 | 3431 | 3378 |
| 600471 | 6432 | 5179 |
| 600521 | 6149 | 5217 |
| 600621 | 6451 | 5555 |
| 00711 | 7004 | 6152 |
| 600791 | 5720 | 5054 |
| 600921 | 7931 | 7018 |
| 690471 | 2491 | 2487 |

As shown in Table 1, the mean target headway, the mean reaction time, and the time step can be tuned in order for the simulated outputs to be close to the observed values. The optimal values for these three parameters are 0.812, 0.269, and 4 respectively, which are different from the default values 1, 1, and 2. After calibration, the simulated outputs can be recorded in Table 5.

Figure 10:
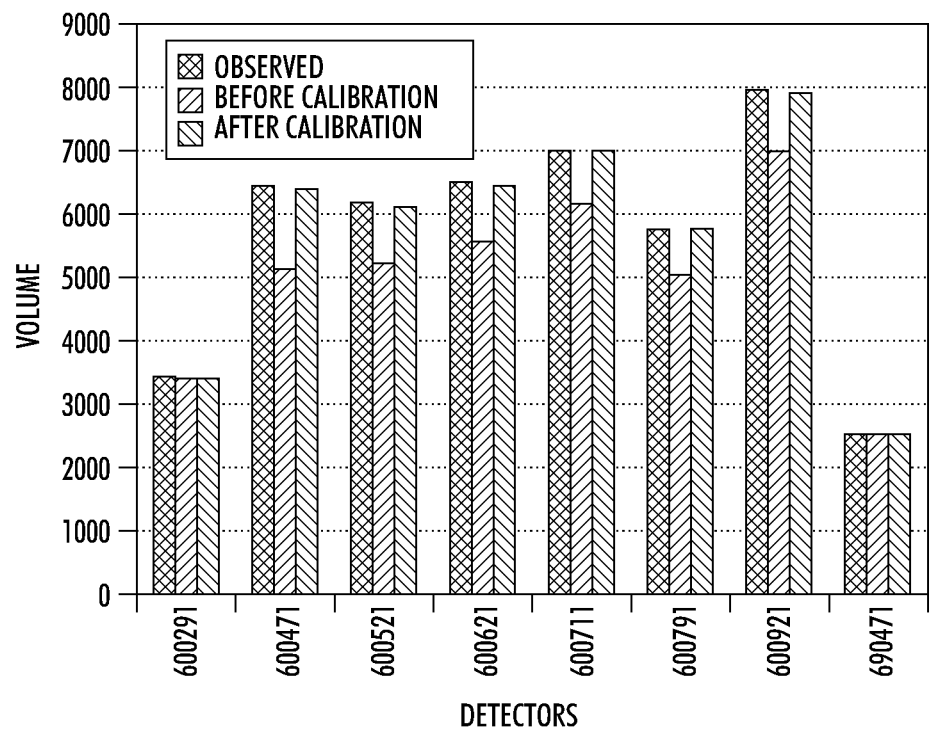
FIG. 10 illustrates a graph depicting comparison of volume before and after calibration, in accordance with the disclosed embodiments.

FIG. 10 shows the comparison of volume before and after calibration. The difference between observed and simulated values is decreased compared to that before calibration.

TABLE 5

| Detector | Observed Values | Simulated Values |
| --- | --- | --- |
| 600291 | 3431 | 3388 |
| 600471 | 6432 | 6381 |
| 600521 | 6149 | 6109 |
| 600621 | 6451 | 6432 |
| 600711 | 7004 | 6989 |
| 600791 | 5720 | 5758 |
| 600921 | 7931 | 7904 |
| 690471 | 2491 | 2496 |

Without loss of generality, the GA-based platform can be employed to maximize the revenue obtained from toll charged for HOT lane, under the situation that the pricing algorithm and the ramp metering mechanism take effect simultaneously. The same steps can be applied when the goal is to maximize the throughput in the HOT lanes or any other variables of interest. The target of the pricing algorithm (e.g., dynamic feedback algorithm) is to maintain the average speed in HOT as desired. If the average speed is lower than the desired speed, the toll rate can be increased by 1 to reduce the traffic volume entering the HOT. On the other hand, if the average speed is higher than the desired value, the toll rate can be decreased by 1 to encourage more vehicles to enter the HOT. The ramp metering mechanism possess the similar logic to the pricing algorithm. If the speed on the main road is lower than the target value, the ramp metering rate is decreased. On the contrary, the ramp metering rate can be increased if the speed on the main road is higher than the target value.

Figure 11:
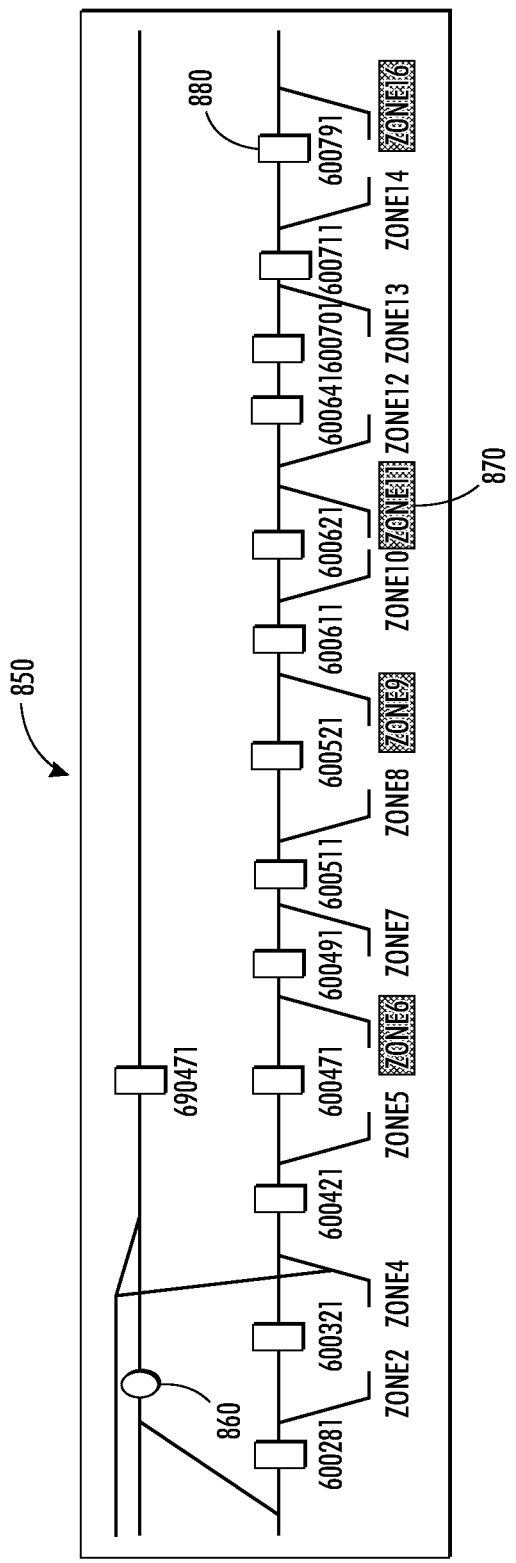
FIG. 11 illustrates an exemplary view of a road map, in accordance with the disclosed embodiments.

FIG. 11 illustrates an exemplary view of a road map 850, in accordance with the disclosed embodiments. The loop detectors are indicated by arrow 860 and the ramp metering lights and the toll gate are indicated by arrows 870 and 880, respectively. The target speed on HOT ranges from 55 mile/hr to 60 mile/hr, and the ramp metering rate changes from 10 vehicles/min to 50 vehicles/min.

Figure 12:
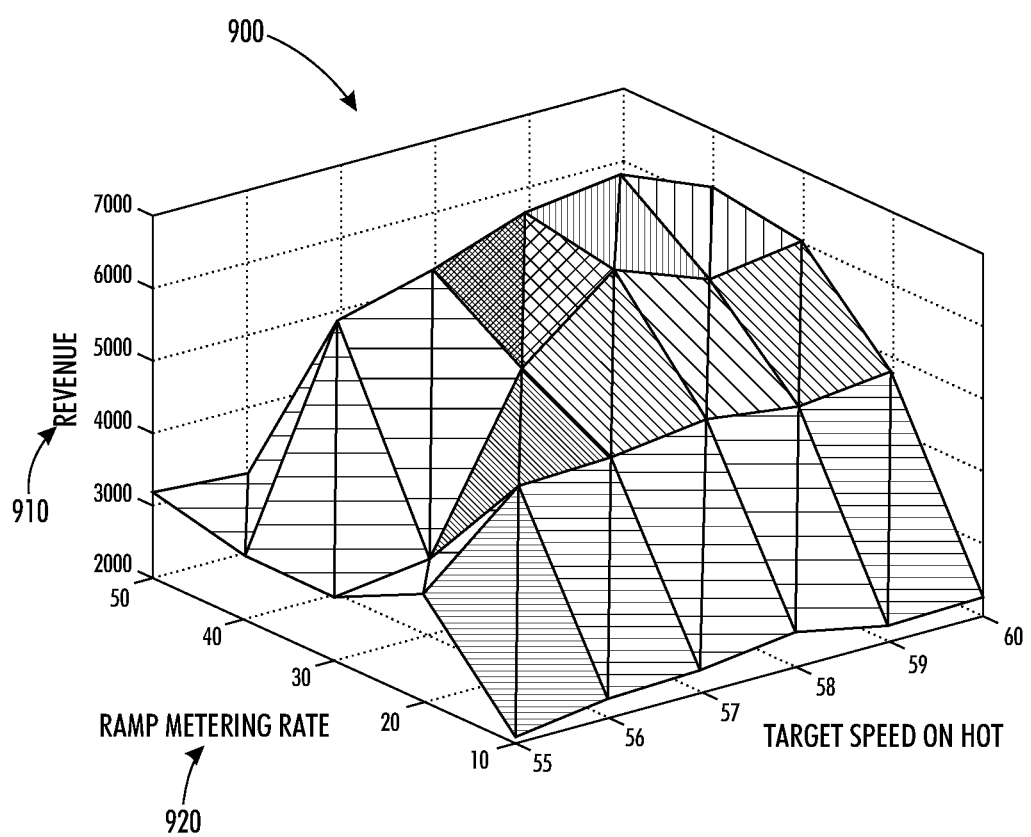
FIG. 12 illustrates a graph depicting revenue versus toll and metering rate, in accordance with the disclosed embodiments.

FIG. 12 illustrates a graph 900 depicting revenue 910 versus toll and metering rate 920, in accordance with the disclosed embodiments. The GA based optimization module 152 can run to get a best gene that is target speed of 59 mile/hr and metering rate from 30 to 40 with the corresponding revenue of $6737 for the interval of one hour. This result is consistent with FIG. 12, where all ramp metering controllers are set with the same rate. If each ramp metering can be adjusted independently, the maximum revenue at $7158 with target speed at 57 mile/hr can be obtained and metering rate for these four ramps at [5, 24], [37, 49], [49, 50], and [34, 36] respectively. The experimental result shows that the GA based optimization module 152 is capable of optimizing multiple ITS strategies simultaneously.

Based on the foregoing, it can be appreciated that a number of embodiments, preferred and alternative are disclosed. For example, in a preferred embodiment, a method (e.g., a computer implemented method) for optimizing a multiple intelligent transportation strategies system can include the steps or logical operations of associating a traffic simulation model with a genetic algorithm based optimization engine for optimizing a plurality of intelligent transportation strategies; estimating an origin-destination matrix that minimizes discrepancies between a simulated and an observed link traffic count by considering a road network and a traffic count with respect to a region; and determining a driver behavior parameter utilizing the origin-destination matrix via calibration so that the traffic simulation model replicates a freeway traffic flow in the region.

In an alternative embodiment, a method can be implemented for optimizing a multiple intelligent transportation strategies system, which includes, for example, the steps or logical operations of associating a traffic simulation model with a genetic algorithm based optimization engine for optimizing a plurality of intelligent transportation strategies; estimating an origin-destination matrix that minimizes discrepancies between a simulated and an observed link traffic count by considering a road network and a traffic count with respect to a region; determining a driver behavior parameter utilizing the origin-destination matrix via calibration so that the traffic simulation model replicates a freeway traffic flow in the region; and obtaining an optimal set of parameters with respect to the plurality of intelligent transportation strategies to optimize a set goal with respect to a given constraint and to meet a level of service metric as well as a revenue target under the plurality of intelligent transportation strategies.

In another embodiment, the driver behavior parameter can include parameters such as, for example, a mean target headway, a mean reaction time, a time step, etc. In yet another embodiment, the optimal parameter can include parameters such as, for example, a pricing algorithm parameter, a ramp metering mechanism, a speed limit, etc.

In still another embodiment, steps or logical operations can be implemented for combining a genetic algorithm with a simplex approach by designating an objective function and encoding a set of configuration parameters with respect to a gene, computing a fitness for each gene and varying the gene utilizing a genetic operator, selecting genes with higher fitness as a next generation in terms of distance between an observed metric and a simulated metric; and terminating an iterative process if a maximum number of iteration times is attained and/or the gene with a fitness greater than a predefined threshold emerges.

In another embodiment, steps or logical operations can be provided for initially setting the parameter to be optimized for a particular stage at a certain value and batch-run the simulation model to output the simulated metric. In yet another embodiment, steps or logical operations can be implemented for comparing the simulated metric with a desired metric to determine a fitness of the gene and feedback a new parameter value obtained from the optimization engine into the simulation model; and repeating the process to obtain the optimized parameter for that stage wherein an output of one stage is employed as an input for a next stage.

In another embodiment, a step or logical operation can be provided for maximizing revenue and throughput obtained from a toll charged for a high occupancy toll lane based on a pricing algorithm and a ramp metering mechanism without loss of generality.

In another embodiment, a system can be implemented for optimizing a multiple intelligent transportation strategies system. Such a system can include a processor, a data bus coupled to the processor, and a computer-usable medium embodying computer program code, the computer-usable medium being coupled to the data bus. The computer program code can include instructions executable by the processor and configured, for example, for associating a traffic simulation model with a genetic algorithm based optimization engine for optimizing a plurality of intelligent transportation strategies; estimating an origin-destination matrix that minimizes discrepancies between a simulated and an observed link traffic count by considering a road network and a traffic count with respect to a region; determining a driver behavior parameter utilizing the origin-destination matrix via calibration so that the traffic simulation model replicates a freeway traffic flow in the region; and obtaining an optimal set of parameters with respect to the plurality of intelligent transportation strategies to optimize a set goal with respect to a given constraint and to meet a level of service metric as well as a revenue target under the plurality of intelligent transportation strategies.

In some embodiments, such instructions can be further configured for combining a genetic algorithm with a simplex approach by designating an objective function and encoding a set of configuration parameters with respect to a gene; computing a fitness for each gene and varying the gene utilizing a genetic operator; selecting genes with higher fitness as a next generation in terms of distance between an observed metric and a simulated metric; and terminating an iterative process if a maximum number of iteration times is attained and/or the gene with a fitness greater than a predefined threshold emerges.

In other embodiments, such instructions can be further configured for initially setting the parameter to be optimized for a particular stage at a certain value and batch-run the simulation model to output the simulated metric. In still other embodiments, such instructions can be further configured for comparing the simulated metric with a desired metric to determine a fitness of the gene and feed back a new parameter value obtained from the optimization engine into the simulation model; and repeating the process to obtain the optimized parameter for that stage wherein an output of one stage is employed as an input for a next stage.

In yet another embodiment, such instructions can be further configured for maximizing revenue and throughput obtained from a toll charged for a high occupancy toll lane based on a pricing algorithm and a ramp metering mechanism without loss of generality.

In another embodiment, a processor-readable medium storing code representing instructions to cause a process for optimizing a multiple intelligent transportation strategies system can be implemented. Such code can include code, for example, to associate a traffic simulation model with a genetic algorithm based optimization engine for optimizing a plurality of intelligent transportation strategies; estimate an origin-destination matrix that minimizes discrepancies between a simulated and an observed link traffic count by considering a road network and a traffic count with respect to a region; determine a driver behavior parameter utilizing the origin-destination matrix via calibration so that the traffic simulation model replicates a freeway traffic flow in the region; and obtain an optimal set of parameters with respect to the plurality of intelligent transportation strategies to optimize a set goal with respect to a given constraint and to meet a level of service metric as well as a revenue target under the plurality of intelligent transportation strategies.

In other embodiments, such code can further include code to combine a genetic algorithm with a simplex approach by designating an objective function and encoding a set of configuration parameters with respect to a gene; compute a fitness for each gene and varying the gene utilizing a genetic operator; select genes with higher fitness as a next generation in terms of distance between an observed metric and a simulated metric; and terminate an iterative process if a maximum number of iteration times is attained and/or the gene with a fitness greater than a predefined threshold emerges.

In some embodiments, such code can further include code to initially set the parameter to be optimized for a particular stage at a certain value and batch-run the simulation model to output the simulated metric. In another embodiment, such code can further include code to compare the simulated metric with a desired metric to determine a fitness of the gene and feed back a new parameter value obtained from the optimization engine into the simulation model; and repeat the process to obtain the optimized parameter for that stage wherein an output of one stage is employed as an input for a next stage.

In yet another embodiment, such code can further include code to maximize revenue and throughput obtained from a toll charged for a high occupancy toll lane based on a pricing algorithm and a ramp metering mechanism without loss of generality.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for optimizing a multiple intelligent transportation strategies system, said method comprising:

associating a traffic simulation model with a genetic algorithm based optimization engine by processing with a computing device said traffic simulation model and said genetic algorithm based optimizing engine in order to optimize a plurality of intelligent transportation strategies utilizing said traffic simulation model;

estimating an origin-destination matrix that minimizes discrepancies between a simulated and an observed link traffic count by considering via a computing device, a road network and a traffic count with respect to a region;

determining a driver behavior parameter via a computing device utilizing said origin-destination matrix via calibration so that said traffic simulation model replicates a freeway traffic flow in said region; and obtaining an optimal set of parameters comprising a pricing algorithm parameter, a ramp meter mechanism and a speed limit with respect to said plurality of intelligent transportation strategies to optimize a set goal with respect to a given constraint and to meet a level of service metric as well as a revenue target under said plurality of intelligent transportation strategies.

2. The method of claim 1 wherein said driver behavior parameter comprises at least the following parameters: a mean target headway; a mean reaction time; and a time step.

3. The method of claim 2 further comprising:

combining a genetic algorithm with a simplex approach by designating an objective function and encoding a set of configuration parameters with respect to a gene;

computing a fitness for each gene and varying said gene utilizing a genetic operator;

selecting genes with higher fitness as a next generation in terms of distance between an observed metric and a simulated metric; and terminating an iterative process if a maximum number of iteration times is attained and/or said gene with a fitness greater than a predefined threshold emerges.

4. The method of claim 3 further comprising initially setting said driver behavior parameter to be optimized for a particular stage at a certain value and batch-run said traffic simulation model to output a simulated metric.

5. The method of claim 3 further comprising:

comparing a simulated metric with a desired metric to determine a fitness of said gene and feedback a new parameter value obtained from said optimization engine into said traffic simulation model; and repeating said process to obtain an optimized parameter for a particular stage wherein an output of said particular stage is employed as an input for a next stage.

6. The method of claim 3 further comprising maximizing revenue and throughput obtained from a toll charged for a high occupancy toll lane based on a pricing algorithm and a ramp metering mechanism without loss of generality.

7. A system for optimizing a multiple intelligent transportation strategies system, said system comprising:

a processor;

a data bus coupled to said processor; and a computer-usable medium embodying computer program code, said computer-usable medium being coupled to said data bus, said computer program code comprising instructions executable by said processor and configured for:

associating a traffic simulation model with a genetic algorithm based optimization engine for optimizing a plurality of intelligent transportation strategies;

estimating an origin-destination matrix that minimizes discrepancies between a simulated and an observed link traffic count by considering a road network and a traffic count with respect to a region;

determining a driver behavior parameter utilizing said origin-destination matrix via calibration so that said traffic simulation model replicates a freeway traffic flow in said region; and obtaining an optimal set of parameters comprising a pricing algorithm parameter, a ramp meter mechanism and a speed limit with respect to said plurality of intelligent transportation strategies to optimize a set goal with respect to a given constraint and to meet a level of service metric as well as a revenue target under said plurality of intelligent transportation strategies.

8. The system of claim 7 wherein said driver behavior parameter comprises at least one of the following parameters: a mean target headway; a mean reaction time; and a time step.

9. The system of claim 8 wherein said instructions are further configured for:

combining a genetic algorithm with a simplex approach by designating an objective function and encoding a set of configuration parameters with respect to a gene;

computing a fitness for each gene and varying said gene utilizing a genetic operator;

selecting genes with higher fitness as a next generation in terms of distance between an observed metric and a simulated metric; and terminating an iterative process if a maximum number of iteration times is attained and/or said gene with a fitness greater than a predefined threshold emerges.

10. The system of claim 9 wherein said instructions are further configured for initially setting said parameter to be optimized for a particular stage at a certain value and batch-run said simulation model to output said simulated metric.

11. The system of claim 9 wherein said instructions are further configured for:

comparing said simulated metric with a desired metric to determine a fitness of said gene and feed back a new parameter value obtained from said optimization engine into said simulation model; and repeating said process to obtain said optimized parameter for that stage wherein an output of one stage is employed as an input for a next stage.

12. The system of claim 9 wherein said instructions are further configured for maximizing revenue and throughput obtained from a toll charged for a high occupancy toll lane based on a pricing algorithm and a ramp metering mechanism without loss of generality.

13. A non-transitory processor-readable medium storing code representing instructions to cause a process for optimizing a multiple intelligent transportation strategies system, said code comprising code to:

associate a traffic simulation model with a genetic algorithm based optimization engine for optimizing a plurality of intelligent transportation strategies;

estimate an origin-destination matrix that minimizes discrepancies between a simulated and an observed link traffic count by considering a road network and a traffic count with respect to a region;

determine a driver behavior parameter utilizing said origin-destination matrix via calibration so that said traffic simulation model replicates a freeway traffic flow in said region; and obtain an optimal set of parameters comprising a pricing algorithm parameter, a ramp meter mechanism and a speed limit with respect to said plurality of intelligent transportation strategies to optimize a set goal with respect to a given constraint and to meet a level of service metric as well as a revenue target under said plurality of intelligent transportation strategies.

14. The processor-readable medium of claim 13 wherein said driver behavior parameter comprises at least one of the following parameters:

a mean target headway;

a mean reaction time; and a time step.

15. The processor-readable medium of claim 14 wherein said code further comprises code to:

combine a genetic algorithm with a simplex approach by designating an objective function and encoding a set of configuration parameters with respect to a gene;
compute a fitness for each gene and varying said gene utilizing a genetic operator;
select genes with higher fitness as a next generation in terms of distance between an observed metric and a simulated metric; and
terminate an iterative process if a maximum number of iteration times is attained and/or said gene with a fitness greater than a predefined threshold emerges.

16. The processor-readable medium of claim 15 wherein said code further comprises code to initially set said parameter to be optimized for a particular stage at a certain value and batch-run said simulation model to output said simulated metric.

17. The processor-readable medium of claim 15 wherein said code further comprises code to:
compare said simulated metric with a desired metric to determine a fitness of said gene and feedback a new parameter value obtained from said optimization engine into said simulation model; and
repeat said process to obtain said optimized parameter for that stage wherein an output of one stage is employed as an input for a next stage.

\* \* \* \* \*